T. BRANCH.
FRUIT GATHERER.
APPLICATION FILED MAR. 27, 1909.
948,465.
Patented Feb. 8, 1910.
2 SHEETS—SHEET 1.
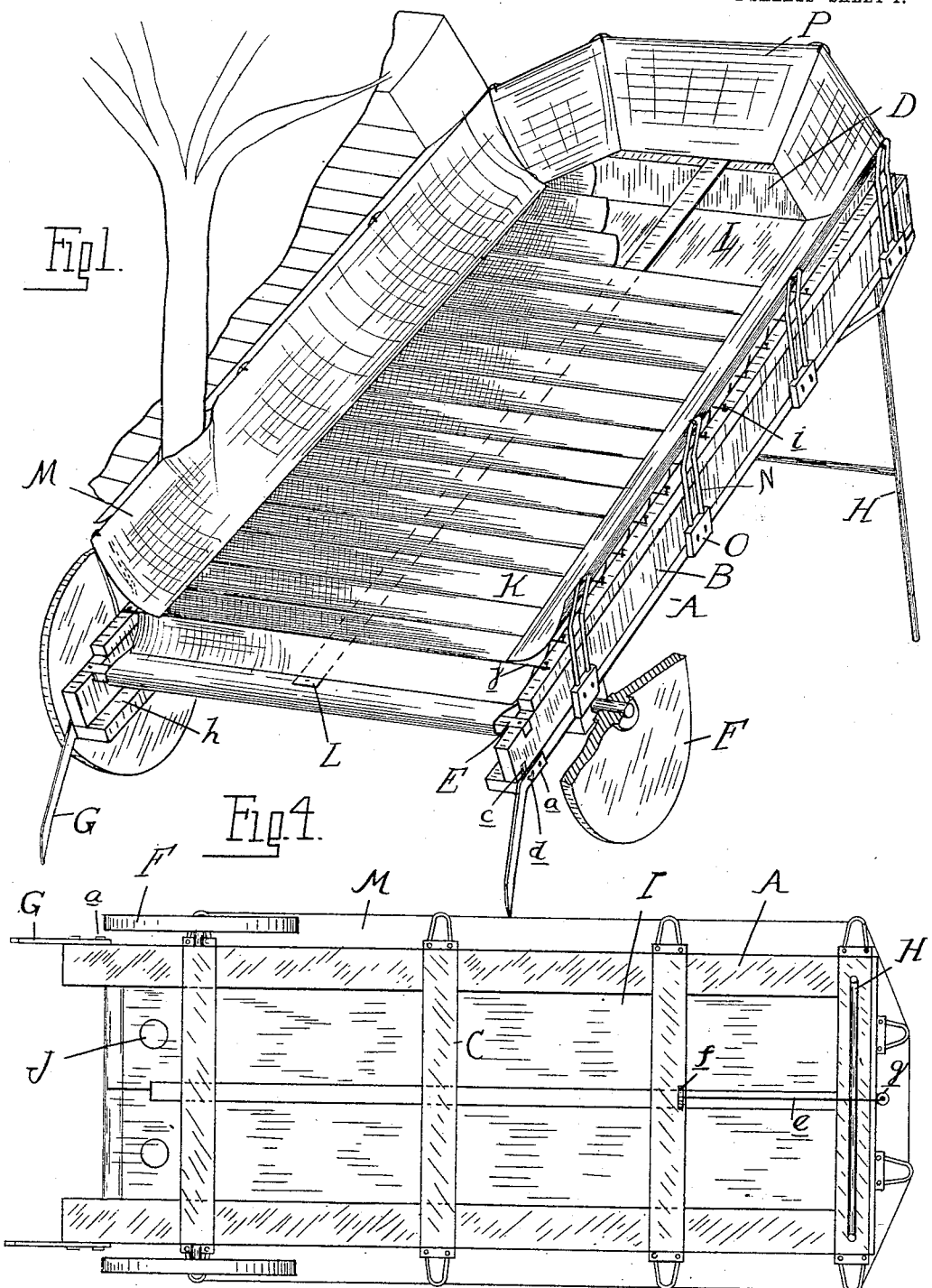
Witnesses
Inventor
Thomas Branch

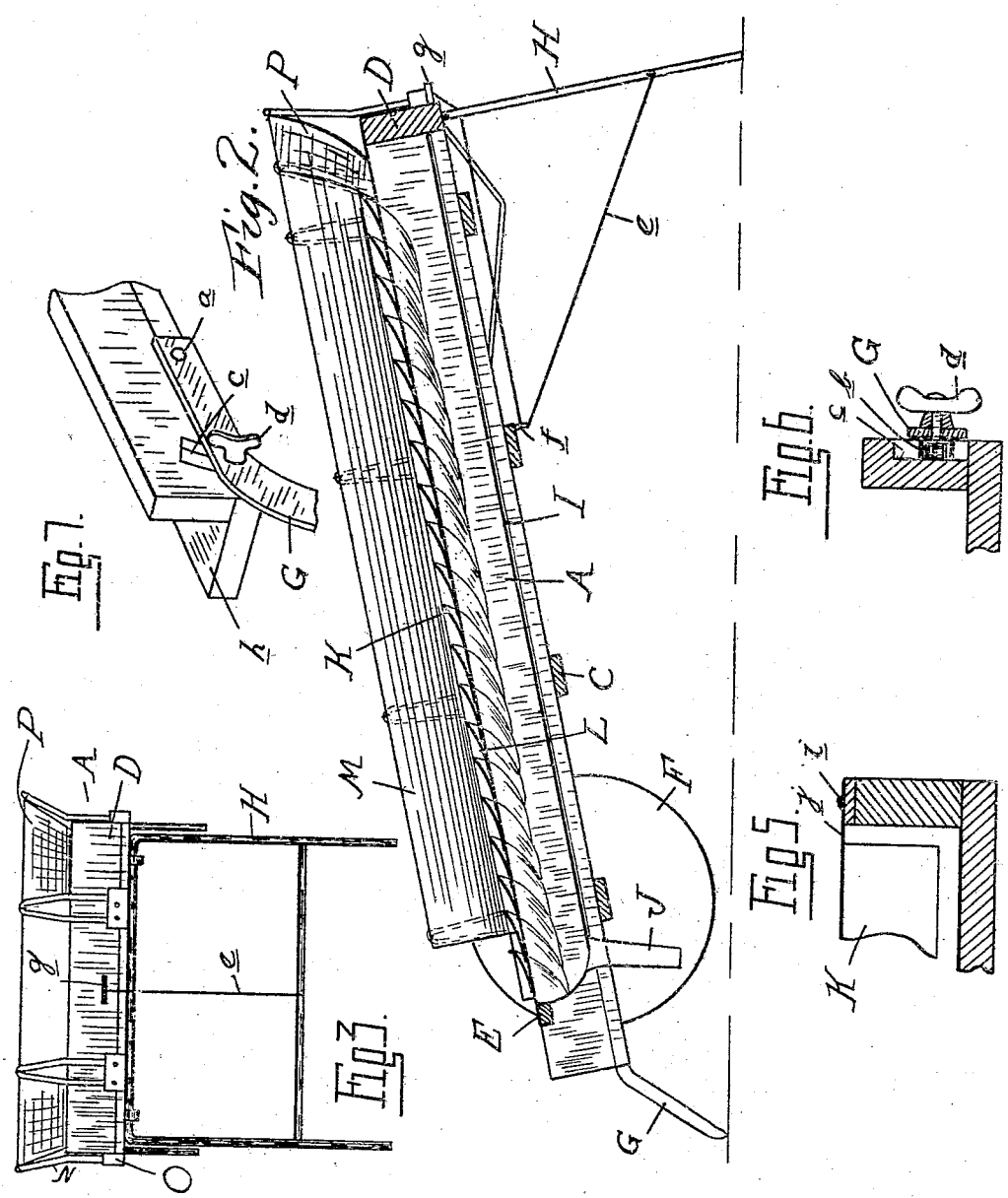

UNITED STATES PATENT OFFICE.

THOMAS BRANCH, OF OTISVILLE, MICHIGAN.

FRUIT-GATHERER.

948,465.  Specification of Letters Patent.  Patented Feb. 8, 1910.

Application filed March 27, 1909. Serial No. 486,247.

*To all whom it may concern:*

Be it known that I, THOMAS BRANCH, a citizen of the United States of America, residing at Otisville, in the county of Genesee and State of Michigan, have invented certain new and useful Improvements in Fruit-Gatherers, of which the following is a specification, reference being had therein to the accompanying drawings.

The invention relates particularly to a device for gathering apples, pears and similar fruit, and consists in its novel construction whereby the fruit may be collected without injury by bruising; further, in the peculiar arrangement and combination of the various parts of the device; and, still further, in certain details of construction as will be more fully hereinafter set forth.

In the drawings,—Figure 1 is a sectional perspective view of the fruit gatherer in readiness for use; Fig. 2 is a vertical central longitudinal section therethrough; Fig. 3 is a rear elevation; Fig. 4 is a bottom plan view; Figs. 5 and 6 are detail sectional views, illustrating parts of the device, and Fig. 7 is a fragmentary perspective view showing the manner of securing the pointed supports to the frame.

In construction, the fruit gatherer comprises a supporting frame A, made up of spaced parallel angle bars B, cross bars C secured to the under surface of the side bars, a rear end bar D, and a forward cross bar E connecting the upper portions of the side sills. In proximity to the forward end the frame described is provided with a pair of carrier wheels F, and in advance of these wheels is a pair of pointed supports G, each pivoted at $a$ to its respective side bar and having an adjustable connection permitting the member to be raised or lowered according as it is desired to move the frame along the ground on the carrier wheels, or to hold it in an inclined elevated position to receive the fruit. The preferable adjustable connection is as shown in Figs. 6 and 7, comprising a headed screw-bolt $b$ arranged within the slot $c$ formed within the side bar for that purpose, and a winged nut $d$ that engages the threaded end of the bolt projecting through an aperture in the support G.

At the rear end of the frame is a swinging support H adapted when in the position shown in Fig. 2 to hold the frame in the desired inclined position. Means are provided for holding the support in an inoperative position, consisting of a cord $e$ connected at one end to the lower portion of the support, extending over a sheave $f$, and connected at its other end to an eye $g$ upon the bar D. Secured upon this framework is a body of yielding material I,—preferably canvas,—connected at the forward end to the cross bar E and at its rear end to the rear bar D, and tacked along its marginal edges to the inturned portions $h$ of the side sills, as indicated in Fig. 1, the canvas being stretched from side to side of the framework so as to be at a sufficient distance above the cross bars C to prevent the fruit in dropping upon the body from striking the bars. At the forward end of the body described are discharge spouts J, formed preferably of canvas and preferably two in number, as indicated in Fig. 4.

Arranged interiorly of the body in transverse alinement is a longitudinal series of aprons K, each being formed of yielding material as canvas and secured at the upper portion of their ends to suitable pins $i$ upon the side sills. These aprons, as shown, are made of such width as to permit their lower edges to rest upon the canvas body and each to extend preferably beneath the next adjoining apron, as indicated in Fig. 1; also, the connection between the apron and the side sills is yielding, an elastic cord or tape as $j$ being preferably employed so that when the fruit strikes the apron the latter will yield slightly, thereby breaking the fall.

For the purpose of holding the several transverse aprons described in their proper relative positions, a central longitudinal elastic band L is employed extending intermediate the bars D and E of the framework, and beneath the transverse aprons as shown in Fig. 2.

For the purpose of protecting the fruit when falling from striking the side edges of the supporting frame, inclined side aprons as M are employed which are adapted to cover the sills. These aprons are made of material similar to the body, are supported at their upper edges upon uprights N upon the side bars mounted in suitable supporting blocks O, and are of a width to extend inwardly a sufficient distance so that their lower edges will rest upon the transverse aprons K. An apron P similar to the aprons just described and mounted upon similar supports is provided for the rear end of the framework.

In collecting the fruit, the gathering device is supported beneath the tree in the inclined position indicated in Fig. 1. The falling fruit strikes upon the aprons and passes along the yielding bottom section to the lower end of the gatherer, where it is discharged through the spouts J into suitable baskets or crates. The several aprons described, in addition to breaking the fall of the fruit and protecting the same from striking the rigid frame, serve to almost immediately cover the fruit and thus protect by a multiple of layers of material that which has fallen upon the gatherer from being struck by fruit subsequently dropping.

When it is desired to shift the apparatus, the rear support H is folded up into parallelism with the body and held in that position by winding the cable about the eye $g$.

The forward supports G are adjusted into their upper position, thereby permitting the device in its entirety to rest upon the carrier wheels F. The gatherer may then be moved into any new position desired.

What I claim as my invention is,—

1. In a fruit gatherer, the combination with a body of yielding material, of a plurality of flexible aprons arranged transversely of the body and at an acute angle thereto, the lower edge of each apron being free from the body.

2. In a fruit gatherer, the combination with a body, of means for supporting the body in inclined position, a discharge spout leading from the lower end of the body, and a series of transversely-alined flexible aprons arranged upon the body at an acute angle thereto.

3. In a fruit gatherer, the combination with a body formed of yielding material and adapted to be supported in inclined position, of a series of transversely-alined flexible aprons arranged over the body at an acute angle thereto, the lower edges of the aprons being free from the body and extending each beneath an adjoining apron.

4. In a fruit gatherer, the combination with a framework, of a body of yielding material supported thereon, a series of transversely-alined yielding aprons arranged over the body at an angle thereto with the lower edge of each apron free from the body, means for supporting the frame in an inclined position, and a discharge spout leading from the body at the lower end thereof.

5. In a fruit gatherer, the combination with a body of yielding material adapted to be supported in an inclined position, of a series of flexible aprons extending over the body in angular relation thereto, and a yielding support for the aprons of the series.

6. In a fruit gatherer, the combination with a framework, of a swinging support at the rear end thereof, a pair of carrier wheels at the opposite end, a pair of pivoted supports at the forward end of the frame in advance of the carrier wheels and adjustably connected to the frame work, a yielding body upon the frame, and one or more discharge spouts leading from the lower end of the body.

7. In a fruit gatherer, the combination with a framework, of means for supporting the same in an inclined position, a body of yielding material upon the framework, a series of transversely-alined flexible aprons extending over the body in angular relation thereto, and an inclined flexible apron covering the marginal portions of the framework and forming in connection with the body a trough-shaped receptacle.

8. In a fruit gatherer, the combination with a framework having a bottom of yielding material, a plurality of flexible aprons arranged transversely of the body and at an acute angle thereto, the lower edge of each apron being free from the body, and an inclined flexible apron covering the marginal portions of the framework.

In testimony whereof I affix my signature in presence of two witnesses.

THOMAS BRANCH.

Witnesses:
W. J. BELKNAP,
JAMES P. BURRY.